Aug. 8, 1961  J. J. McMAHON  2,995,307
MOBILE SPRAYING APPARATUS
Filed July 15, 1957  8 Sheets-Sheet 1

FIG. 1

John J. McMahon
INVENTOR.

BY Darby + Darby
ATTORNEYS

John J. McMahon
INVENTOR.
BY Darby & Darby
ATTORNEYS

John J. McMahon
INVENTOR.

BY Darby + Darby
ATTORNEYS

United States Patent Office 2,995,307
Patented Aug. 8, 1961

2,995,307
MOBILE SPRAYING APPARATUS
John J. McMahon, Johnson City, N.Y., assignor to Custom Spray Equipment Corporation, Johnson City, N.Y., a corporation of New York
Filed July 15, 1957, Ser. No. 671,900
13 Claims. (Cl. 239—161)

This invention relates to mobile spraying apparatus, and, more particularly, to an improved arrangement of a controlled spraying boom for use on vehicles. Spraying of roadsides with insecticides, herbicides and other chemicals for purposes of insect and weed control has become very common, especially since the advent of modern superhighways. The spraying of streets and parkways to minimize the generation of dust clouds is also common. Further, for many years certain agricultural crops have been sprayed for protection against insects. In order to cover large areas with reasonable efficiency, spraying equipment was mounted on vehicles, such as trucks, at an early date. Probably the most common method of mobile spraying is the simple manual method utilizing a nozzle carried on the end of a flexible hose, the spray solution being directed by one person while a second person drives the truck upon which the spraying apparatus is mounted.

While such a method is almost completely versatile and adaptable to effect proper spraying under most usual spraying conditions, it will be readily recognized that apparatus easily controllable by the driver himself would result in considerable savings in labor costs. Various attempts have been made to provide suitable driver-controlled mobile spraying apparatus, but such prior art attempts have been unsuccessful, especially in that such apparatus has not been sufficiently versatile to allow desired spraying operations under the extremely wide variety of conditions commonly encountered. While it might be possible to construct elaborate servo-controlled apparatus of great flexibility, simplicity and ruggedness are of paramount importance for reasons of both initial and maintenance costs.

It is therefore a primary object of the invention to provide improved mobile spraying apparatus capable of numerous diverse spraying operations which is readily controllable by an operator, such as a truck driver.

It is another object of the invention to provide spraying apparatus of the abovementioned character which is readily controllable for spraying in numerous directions and at numerous locations.

It is a further object of the invention to provide improved spraying apparatus of the abovementioned character having a retractable boom easily controllable to direct spray solution in a variety of selected directions.

It is a further object of the invention to provide improved spraying apparatus of the above-mentioned character having a movable boom that may be easily adjustable for spraying operations over diverse terrain.

Other more detailed objects will be readily apparent from the following description and the drawings accompanying this specification, in which.

Figure 1:
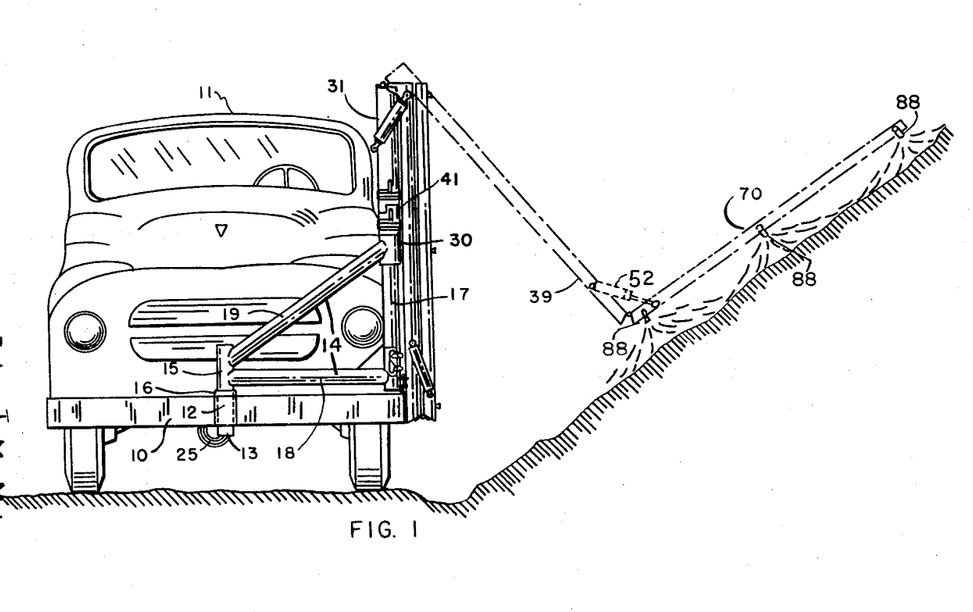
FIG. 1 is a perspective view of one form of this invention shown mounted on the front end of a truck.

Referring now to FIG. 1 there is shown an illustrative embodiment of the invention particularly adapted for roadside spraying. Fixedly attached to the bumper 10 of the vehicle 11, shown as comprising a motor truck, is a vertically disposed sleeve 12 in which the shaft end 13 of a vertical member 15 of frame 14 is rotatably journalled. Rigid members 15, 17, 18 and 19 form a rigid frame, the vertical position of which is determined by the fact that bearing collar 16 bears on the upper edge of the sleeve 12. A yoke 44 surrounds vertical member 17 to which is removably attached bar 45 attached to the fender 42 of the vehicle 11 in order to support the frame 14. Vertical member 17 extends slightly below the horizontal member 18 so as to have its end rest near or on the bumper 10 and has mounted on it means for locking the rigid frame 14 in fixed position on the bumper. The locking means in this preferred embodiment comprises a spring loaded pin 46 removably engaging a hole 47 provided in the bumper 10. The vertical member 17 has mounted thereon a rotatable swivel connection 31 to which retractable boom 39 and extension 70 having nozzles are hingedly connected.

The swivel connection can be seen in greater detail in FIGURES 3, 4a, 4b and 4c, where it is shown comprising the combination of three tubular sleeves cooperatively journalled on the vertical member 17 for axial rotation. A first sleeve 30 is welded at or near the juncture of frame member 19, while a second and third sleeve 41 and 31 are rotatably journaled adjacent to it. The sleeves, 30, 41 and 31 are respectively keyed to engage each other so that the second and third sleeves 31 and 41 may rotate through a limited arc about the vertical member 17. Torsion coil springs 32 and 33 are respectively mounted about the sleeves having the ends of spring 32 fixed respectively to sleeves 30 and 41 and the ends of spring 33 are fixed respectively to sleeves 31 and 41. The springs are biased and the sleeves are so keyed so that in a normal rest position the sleeves will, under stress conditions, rotate about its own longitudinal axis in an arc of approximately 180°. The boom is mounted on the sleeve 31 in such a manner that when the swivel connection is in its normal rest position the boom will extend laterally substantially perpendicular to longitudinal axis of the vehicle; and when rotated the boom will follow axes normally parallel to the longitudinal axis of the vehicle so as to substantially swing back along the side of the vehicle instead of extending rigidly outward therefrom.

Figure 14:
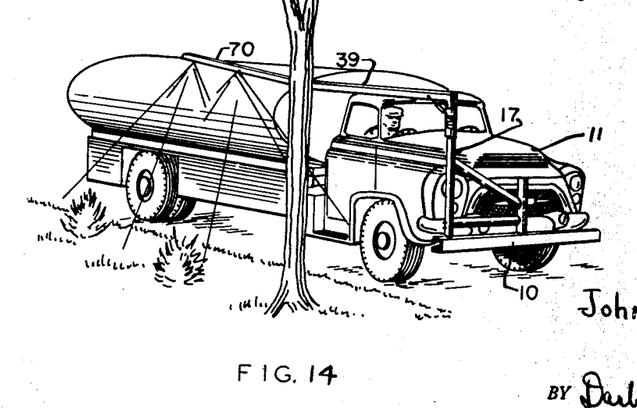
FIG. 14 is a view showing the application of the swivel joint of this invention in overcoming obstacles in the path of operation.

This swivel arrangement has as a primary purpose the protection of the spraying apparatus and the avoidance of any undue delay or inconvenience in the event that large obstacles such as poles or trees are encountered. As can be seen in FIG. 14 the boom when striking an obstacle, in this case a tree, will swing back against the truck allowing the truck to continue onward, and after passing the obstacle will return to its normal outward position. The swivel connection thus permits continuous spraying in any terrain without fear of damage to the apparatus or external objects.

Figures 3, 4A, 4B, 4C:
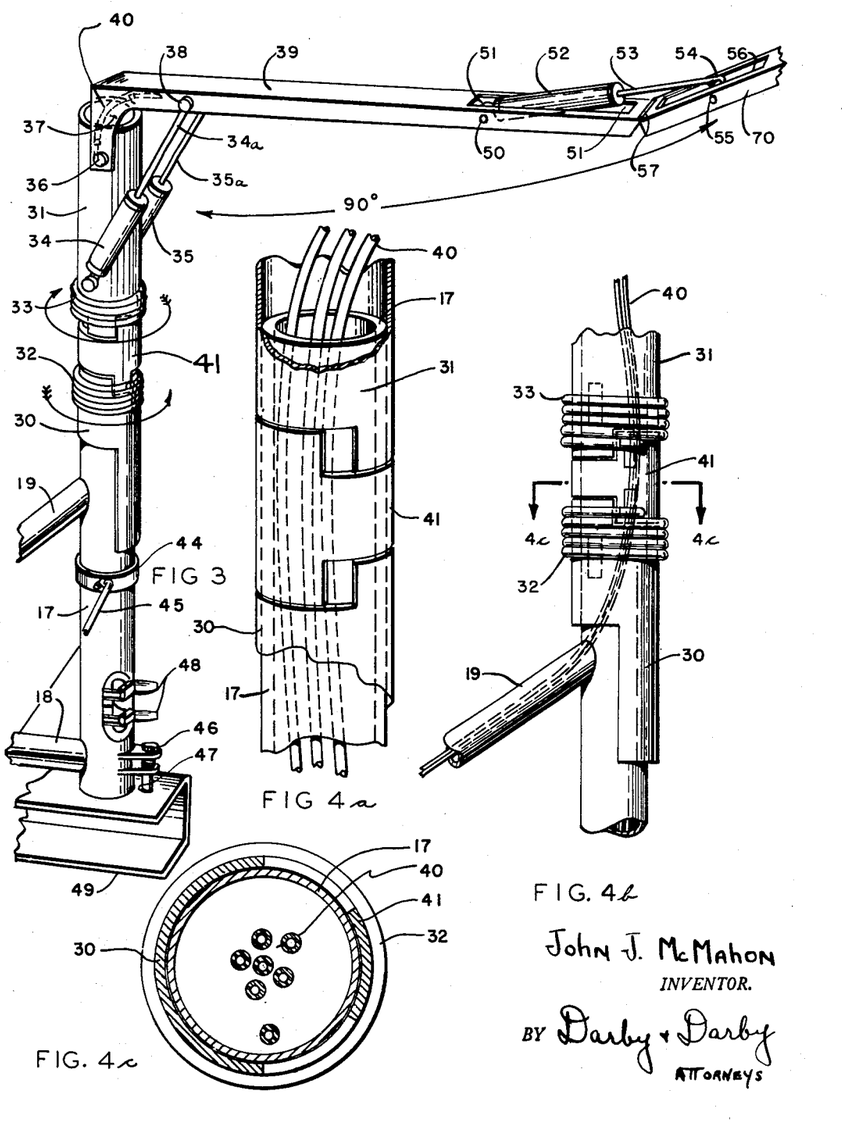
FIG. 3 is a detail drawing showing in perspective the pivoting joint portion of this invention and illustrating how inner and outer members of the retractable boom may be connected for activation by hydraulic cylinders.
FIGS. 4a and 4b are enlarged detail drawings illustrating the swivel joint by which the retractable boom is mounted on the vehicle frame.
FIG. 4c is a cross-section view taken along lines 4c—4c of FIG. 4b illustrating the concentric relationship of the elements of the swivel joint.
Figure 5:
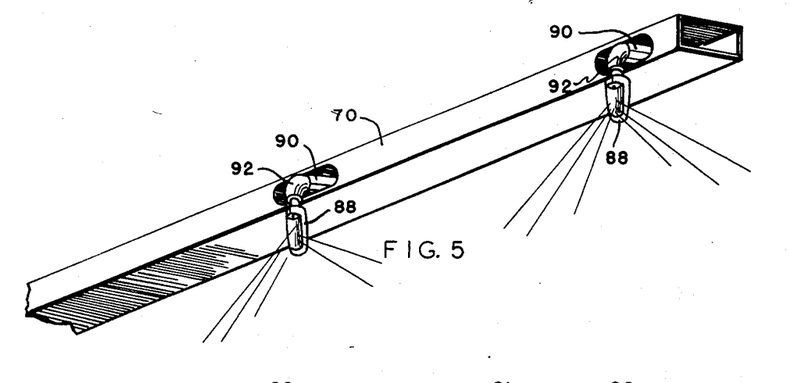
FIG. 5 is a perspective view of a boom member showing spray nozzles protruding.
Figure 6:
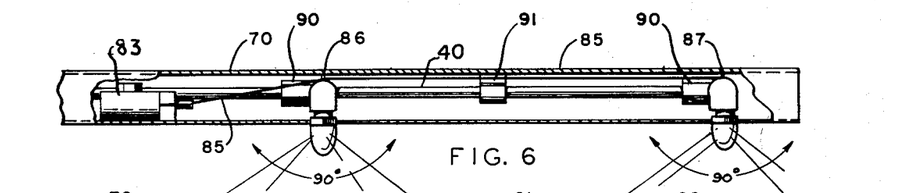
FIG. 6 is a front plan view of the same portion of the boom as is shown in FIG. 5 and illustrating how the nozzles may be axially rotated.
Figure 7:
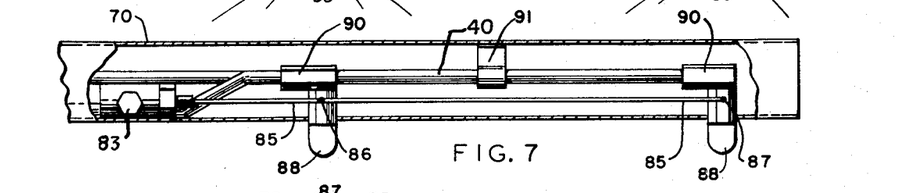
FIG. 7 is a top plan view of the same portion of the boom as shown in FIG. 5 and FIG. 6.
Figure 8:
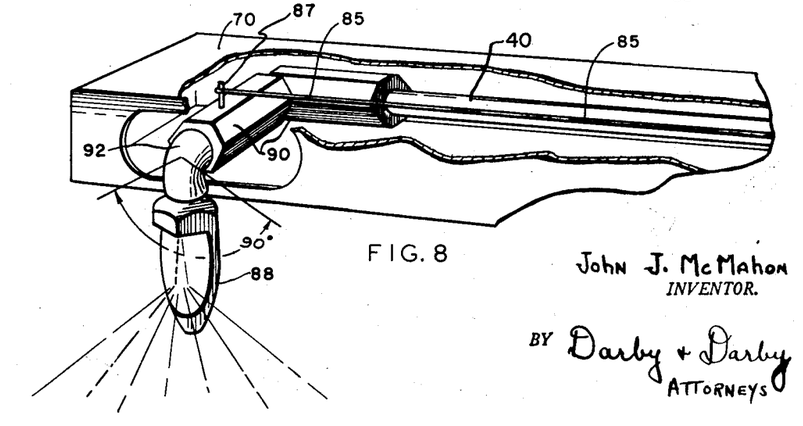
FIG. 8 is an exploded view of a section of that portion of the boom shown in the preceding figures in reversed position.

The rectangular boom 39 and its extension 70 referred to above, is also seen in detail in FIG. 3, and comprises a pair of hollow rectangular beams pivotally joined together by hinge 57. The boom 39 has a perpendicular bifurcated extension 37 at its free end by which it is pivotally hinged to the rotatable sleeve 31 journalled on the vertical frame member 17. A pair of hydraulic cylinders 34 and 35 and their respective pistons 34a and 35a, operatively connected to control means located in the cab of vehicle 11, are attached to the boom 39 and the rotatable connection 31 so that the boom 39 may be caused to pivot through at least a 90° arc with respect to the vertical frame member 17. The upper surfaces of boom 39 and extension 70, adjacent the common hinge 57 are cut away and there is recessed therein a hydraulic cylinder 52 and piston 53, operatively connected to means located in the cab of the vehicle, 11, and respectively attached to pins 50 and 55. Thus extension 70 may be caused to pivot through an arc of substantially 170° with respect to boom 39.

Figure 2A:
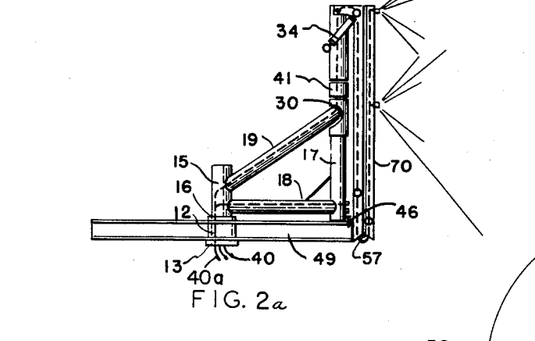
FIGS. 2a, 2b, 2c, show an illustrative embodiment of retractable boom arrangement and vehicle mounting frame of this invention, with the boom shown maneuvered to various positions.
Figure 2B:
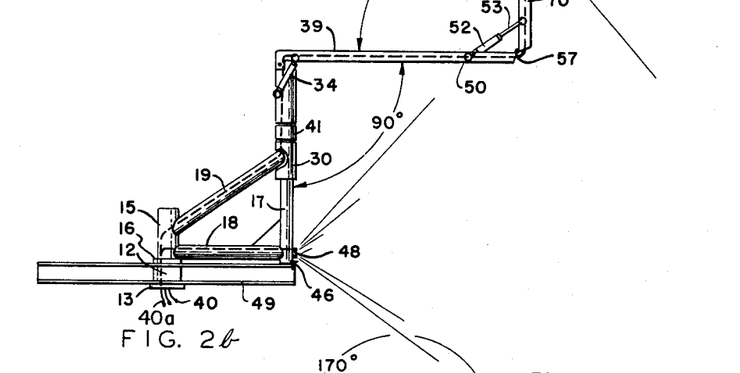
Figure 2C:
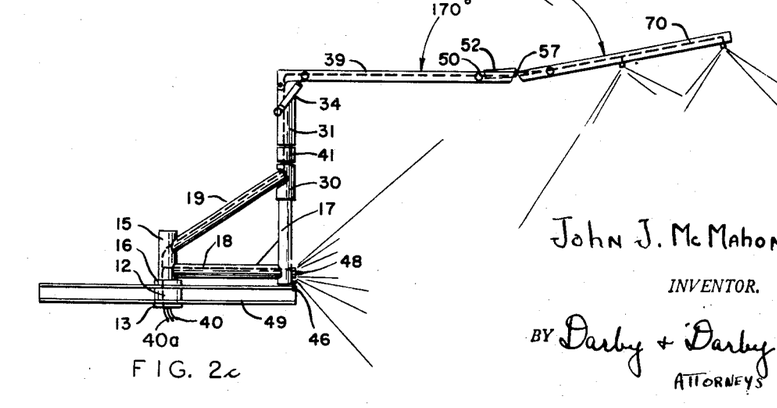

As will be shown later in a discussion of the hydraulic control system these hydraulic cylinders may be operated individually or simultaneously obtaining a variety of positions for the boom 39 and the extension 70 so that it may closely conform to the contour of the terrain. In FIGURES 2a, 2b and 2c, three illustrative positions of the retractable boom may be seen. From these figures it will also be obvious that other positions are equally obtainable.

The particular arrangement of folding arms such as is here used, is unique in regard to the versatility of its positioning. With the hydraulic controls shown later the boom may be extended either directly up into the air, outwardly from the side of the vehicle, or even below the actual grade levels of the truck directly from within the vehicle cab.

Furthermore, as an infinite number of intermediate positions may be obtained the boom may even be caused to conform to a terrain that is continually changing. Obstructions such as guide posts, poles or signs which are close to the road will not interfere with the spraying operation as the boom may be extended to a position so that most of them will be avoided. When those larger obstacles such as trees and communication poles are encountered the swivel connection described above will permit the continued and uninterrupted operation of the apparatus without any adjustment in the boom necessary. When not in use the boom and its extension may be retracted so that they lie flat against the vertical frame member 17 permitting the vehicle to be safely operated upon the highway as under normal conditions. It is thus obvious that this invention provides highly mobile, adjustable and efficient apparatus for roadside spraying and other uses.

The entire frame 14 and its attached boom 39 may be swung from one side of vehicle 11 to the other so that spraying may be accomplished with ease on either side of the roadway as desired. The frame 14 rotates within sleeve 12, and a hole similar to that of hole 47 is provided on the opposite end of the bumper 10 so that the frame may be firmly held in place. Shown generally at 25 as leading into the lower end of the sleeve 12 are a plurality of hydraulic pressure control valves and spray solution tubes. These valves are each connected at one end to conduits leading to a number of control valves mounted within the cab of the vehicle 11 and at the other end to conduit 40 extending upwardly through sleeve 12 inside members 15 and 19 through vertical member 17 to connect ultimately to the hydraulic cylinders and spray nozzles shown above. Since sleeve 12 and member 15 are centrally located in a lateral sense on vehicle 11 it will be seen that no re-arrangement of the conduits 25 is required when the frame is swung from one side of the vehicle to the other.

The actual spraying is accomplished through a pair of spray nozzles mounted in and protruding from the extension 70 and connected to the fluid conduit 40. In order to increase the efficiency and effect of this device the nozzles 88 are provided with a swivel connector 90 so that they may be rotated through an arc of 90°. A hydraulic cylinder 83 operatively connected to the means located in the vehicle cab and having a steel flexible cable and rod 85 fastened at 86 and 87 to the swivel connector 90 provides the means by which the nozzle can be rotated. A separate and distinct pair of spray nozzles 48 capable of spraying those areas immediately adjacent the vehicle are located in and extend from the lower portion of the vertical frame 17. These nozzles 48 are separately fed with spray solution through conduit 40a routed through frame member 18 and are rotatably operated by separate control means similar to those controlling nozzles 88, so that they too may rotate through an arc of 90°. Further, nozzles 48 do not extend within the plane of boom 39 or extension 70 so that even with boom 39 fully retracted the nozzles 48 will be able to spray solution. They may be used either as a supplement to those nozzles located on the extension 70 or alone, if desired.

Figure 10:
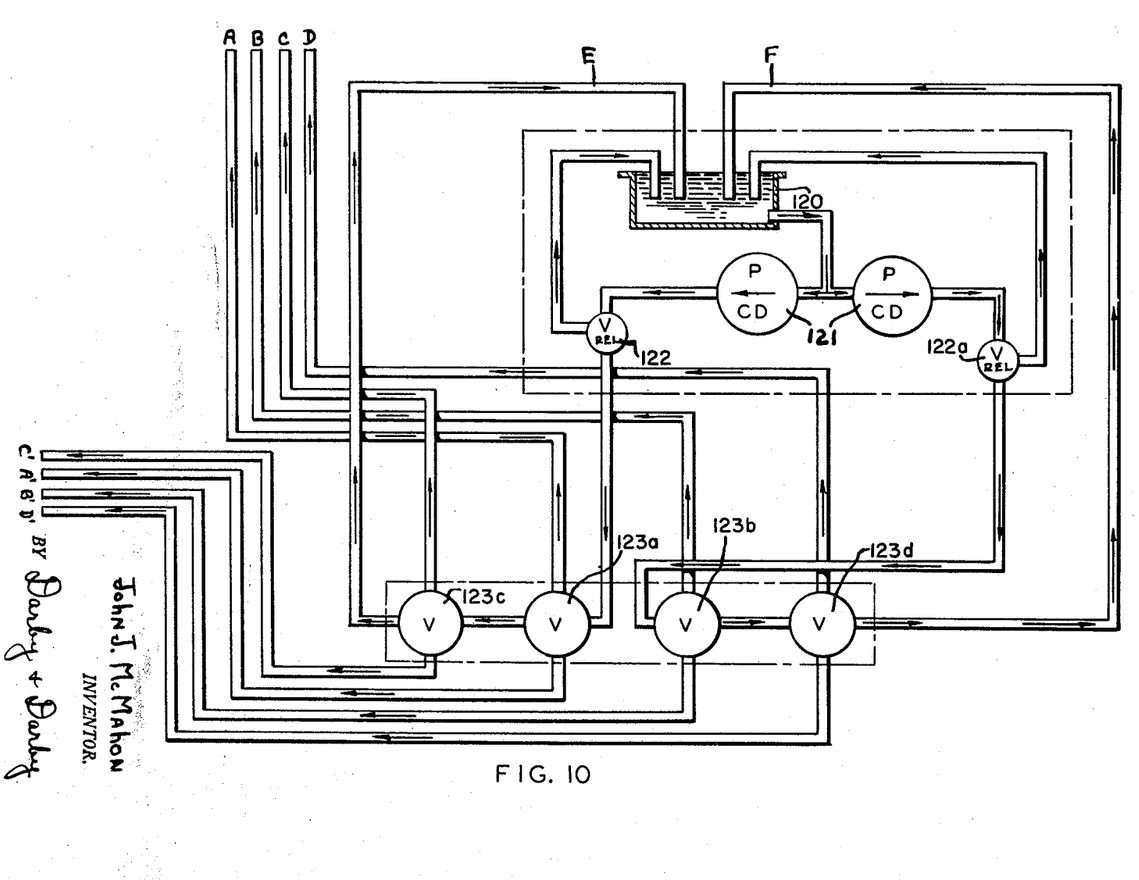
FIG. 10 is a schematic diagram illustrating the hydraulic control system for maneuvering the retractable boom and nozzles.

The hydraulic operating and control system is shown in schematic form in FIG. 10. The fluid pressure is delivered by a double pump 121 such as the "Vickers Vane; series V2220" which is most conveniently housed under the hood of the vehicle, where it is attached to the fan belt of the motor.

Figure 11:
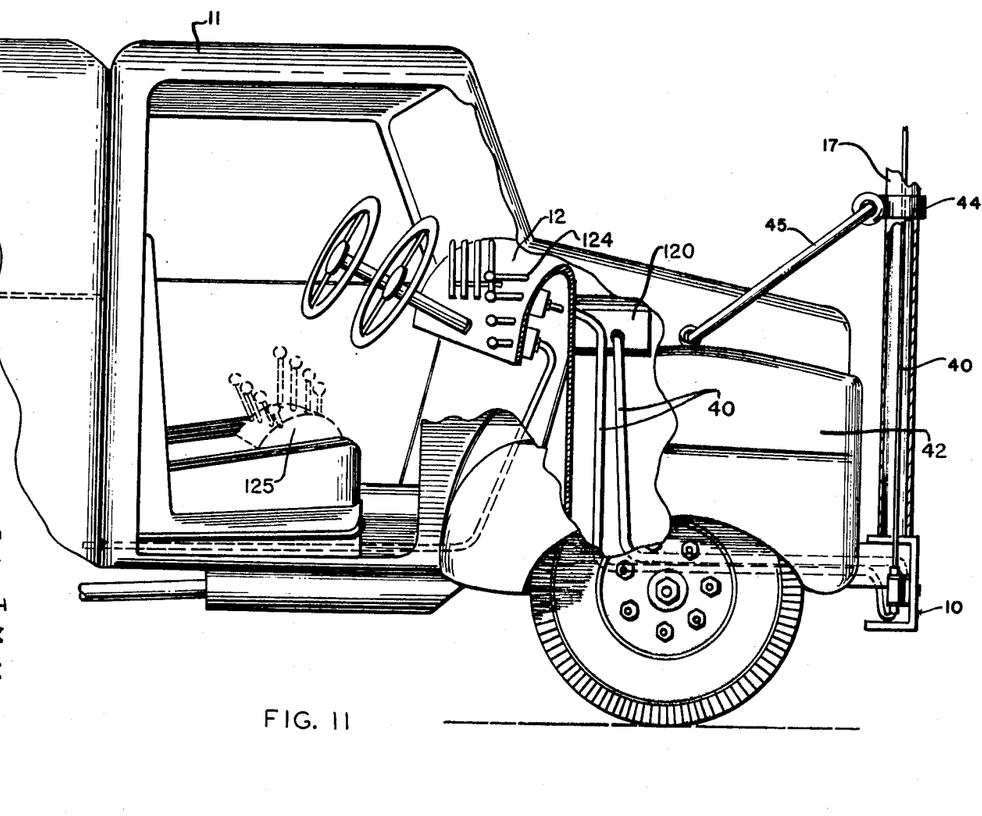
FIG. 11 is a perspective view of a truck illustrating the mounting of the retractable boom and frame and the location of the spray and hydraulic control.
Figures 12, 13:
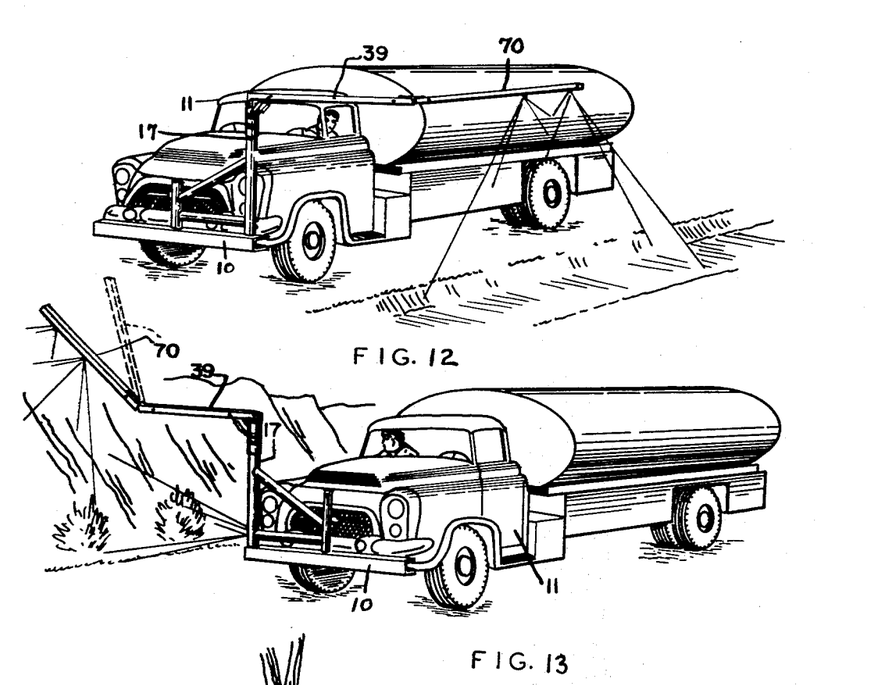
FIG. 12 is a view of a truck in operation having mounted on it an embodiment of this invention.
FIG. 13 is a similar view to that of FIG. 12 showing the embodiment of this invention mounted on the opposite sides of the truck.

Valves 123 for controlling the flow of fluid are mounted on the dashboard 124 of the cab of the vehicle 11 as shown in FIGURE 11, and are each linked by a pair of tubular conduits and provide reciprocal pressure, inwardly and outwardly, to the respective double acting cylinders controlling the movement of the boom and spray nozzles. For example, valve 123a which is linked through conduit lines A and A' to both cylinders 34 and 35 controls the raising and lowering of boom 39. Similarly valve 123b through lines B and B' is linked to cylinder 52 and controls the pivoting of extension 70 about hinge 57. Valves 123c and 123d respectively linked by lines C and C' and D and D' to cylinder 83 and the nozzle control cylinder located in frame member 17 control the rotation of spray nozzles 88 and 48.

Excessive fluid and/or pressure may be bled off through relief valves 122 and 122a or through conduit lines E and F. An optional mounting for the control valves 123 is shown between the seats 125 of the vehicle cab in FIGURE 11.

Figure 9:
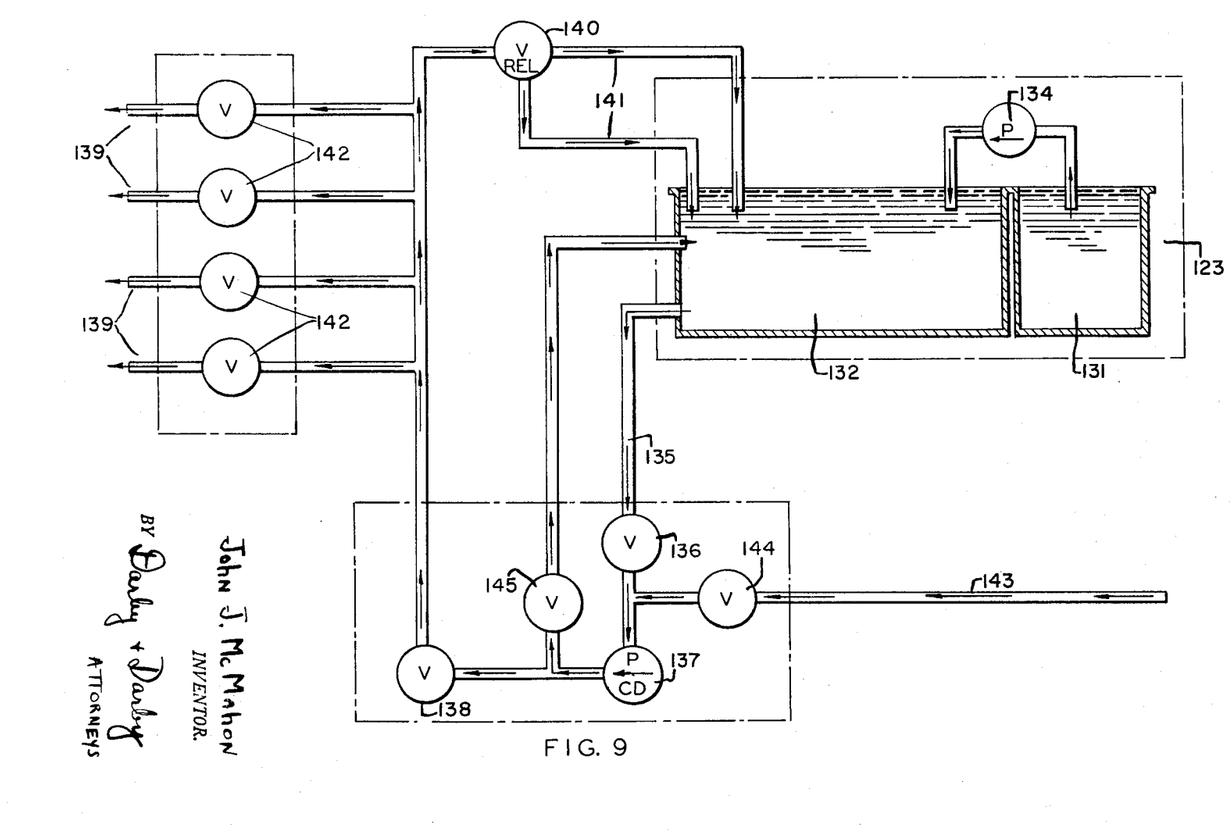
FIG. 9 is a schematic diagram illustrating one embodiment of the invention spray solution pumping system.

In the embodiment of this invention as described the spraying system is shown schematically in FIG. 9 of the drawings. It will be seen that the vehicle tank area 131 comprises two separate and distinct sections; a water solution tank 132 and a smaller concentrate tank 133.

As water can be obtained most freely, the provision of a separate tank containing a strong concentration of insecticide, herbicide or other chemical permits the spraying of relatively large areas without undue delay or interruption due to exhaustion of spray solution. When the initial tank load of spray solution is consumed it is merely necessary to locate a nearby source of water, such as a stream, fill the tank and add a portion of the concentrate. This may be done as often as necessary without the need of the spray truck having to return to its plant or garage for the purpose of refilling its tanks.

The solution tank may be filled with water by connecting conduit 143 to any source and opening valve 144 (valve 136 being closed). The water flows into pump 137 and is forced through valve 145 (valve 138 being closed) into the solution tank. This permits water to be drawn from such sources having little or no pressure. The concentrate is then added to the water in proper proportion by the operator who manipulates the hand pump 134.

During the spraying operation the mixed solution is drawn from tank 132, through tubular line 135, through valve 136 into pump 137 (valve 144 is now closed) from which it is pumped through valve 138 (valve 145 is now closed) into nozzles 88 and 48. Excess solution is returned to the solution tank through relief valve 140, through lines 141. Valves 142 situated on the dashboard 124 of the vehicle directly control the flow of the spray to the respective nozzles. As with the controls of the hydraulic system an optional mounting for valves 142 is between the seats 125. The other valves 136, 138, 144 and 145 are most conveniently placed somewhere on the outside of the vehicle 11.

In the construction of this apparatus it has been found suitable to use the following material and specifications. This data is included here merely as illustrative of the embodiment shown, and it will be obvious that the material, its size and specifications can be varied, changed or otherwise modified while obtaining the same result.

The members 17, 18 and 19 of the frame 14 are formed of 3" O.D. 11 gauge steel tubing, while the member 15 is of 4" O.D. 8 gauge steel tubing. Sleeve 12 and collar 16 are of 4½" O.D. 11 gauge steel tubing. In general, steel tubing is used as conduit to convey both the spray solution and hydraulic fluid, ¼" tubing for the hydraulic system and ½" tubing for the spray fluid. Where flexibility of joints is needed rubber or flexible tubing is used as is shown at 25. A pivoting connector such as those shown at 90 formed of an "Alemite ½" size pressure swivel" may also be used so that wear and fatigue may be avoided where excessive movement and rotation is required. However, it is believed that generally flexible tubing will be more than adequate.

The preferred length of both the inner and outer sections of boom 39 and extension 70 is approximately 80". This will give a height to the boom 39 of approximately 8 feet above ground level. Thus it will be seen that the extension 70 may reach as high as 15 feet above the ground level, and as far outwardly from the vehicle as 13 feet. The boom 39 and extension 70 are operated by a pair of 1½" bore, 12" double-acting hydraulic cylinders and the nozzles 88 and 48 are rotated by a pair of 1" bore, 1" stroke double-acting hydraulic cylinders.

It is quite obvious that although we have described the preferred embodiment of both the hydraulic and spray systems, in detail, these systems may be considerably varied by re-arrangement of their elements and by the addition of other conduits and/or valves. Furthermore, other systems producing the same results can quite obviously be substituted for this.

In like manner the mechanical elements described previously are also subject to modification and substitution by any of a number of similar means. It is therefore the desire of the applicant not to be bound by the description of his invention as contained in this specification but to be bound only by the claims as appended hereto.

What is claimed:

1. Mobile spray apparatus for use on a wheeled vehicle comprising in combination a frame fixedly attached to said vehicle, said frame having a vertical member extending upwardly near one side of said vehicle, a multi-section boom having an inner member and an outer member, and having an inner end of said inner member hingedly attached to the upper extremity of said vertical member, power-actuated means connected to said boom member and said vertical member for raising and lowering said inner boom member, said multi-section boom outer member being hingedly attached to the outer end of said inner member, power actuated means connected between said inner and outer members for pivoting said outer boom member with respect to said inner member about said hinge, and a plurality of nozzles disposed along at least one of said boom members, the axes of said hinged attachments normally being parallel to the longitudinal axis of said vehicle, said frame member being pivotally mounted substantially at lateral center of said vehicle whereby said vertical member may be swung to be positioned at either side of said vehicle, said vehicle carrying means for locking said vertical member in either position.

2. Mobile spray apparatus for use on a wheeled vehicle comprising in combination a frame fixedly attached to said vehicle, said frame having a vertical member extending upwardly near one side of said vehicle, a multi-section boom having an inner member and an outer member, and having an inner end of said inner member hingedly attached to the upper extremity of said vertical member, power-actuated means connected to said boom member and said vertical member for raising and lowering said inner boom member, said multi-section boom outer member being hingedly attached to the outer end of said inner member, power actuated means connected between said inner and outer members for pivoting said outer boom member with respect to said inner member about said hinge, and a plurality of nozzles disposed along at least one of said boom members, the axes of said hinged attachments normally being parallel to the longitudinal axis of said vehicle, said vertical member comprising a lower member fixedly attached to said vehicle and a concentric upper member secured thereto and journaled for rotation about its axis, said lower and upper members being connected by a torsion coil spring encircling said members to tend to hold said upper member in such position that said boom members extend laterally from said vehicle.

3. Mobile spraying apparatus for use on a wheeled vehicle comprising, in combination, a frame fixedly attachable to said vehicle, said frame having a vertical member extending upwardly near one side of said vehicle, a multi-section boom having an inner member with its inner end hingedly attached to the upper extremity of said vertical member, a first hydraulic cylinder connected to said vertical member and said inner boom member to raise and lower said inner member, said multi-section boom having a second boom member hingedly attached to the outer end of said inner member about an axis parallel to that of the first said hinged attachment, a second hydraulic cylinder connected to said inner boom member and said second boom member to actuate said second boom member, a plurality of nozzles disposed along said second boom member, control valve means mounted on said vehicle for controlling said hydraulic cylinders, means for supplying fluid to said nozzles and further control valve means connected therewith for controlling flow of spray fluid to said nozzles, said frame being pivotally mounted substantially at the lateral center of said vehicle, whereby said vertical member may be swung to be positioned near either side of said vehicle, and means for locking said vertical member in either position.

4. Mobile spraying apparatus for use on a wheeled vehicle comprising, in combination, a frame fixedly attachable to said vehicle, said frame having a vertical member extending upwardly near one side of said vehicle, a multi-section boom having an inner member with its inner end hingedly attached to the upper extremity of said vertical member, a first hydraulic cylinder connected to said vertical member and said inner boom member to raise and lower said inner member, said multi-section boom having a second boom member hingedly attached to the outer end of said inner member about an axis parallel to that of the first said hinged attachment, a second hydraulic cylinder connected to said inner boom member and said second boom member to actuate said second boom member, a plurality of nozzles disposed along said second boom member, control valve means mounted on said vehicle for controlling said hydraulic cylinders, means for supplying fluid to said nozzles and further control valve means connected therewith for controlling flow of spray fluid to said nozzles, said vertical member comprising a lower member fixedly attached to said vehicle and a concentric upper member secured thereto and journalled for rotation about its axis, said lower and upper members being connected by a torsion coil spring encircling said members to tend to hold said said upper member in such a position that said boom members extend laterally from said vehicle.

5. Mobile spraying apparatus for use on a wheeled vehicle comprising, in combination, a frame fixedly attachable to said vehicle, said frame having a vertical member extending upwardly near one side of said vehicle, a multi-section boom having an inner member with its inner end hingedly attached to the upper extremity of said vertical member, a first hydraulic cylinder connected to said vertical member and said inner boom member to raise and lower said inner member, said multi-section boom having a second boom member hingedly attached to the outer end of said inner member about an axis parallel to that of the first said hinged attachment, a second hydraulic cylinder connected to said inner boom member and said second boom member to actuate said second boom member, a plurality of nozzles disposed along said second boom member, control valve means mounted on said vehicle for controlling said hydraulic cylinders, means for supplying fluid to said nozzles, further control valve means connected therewith for controlling flow of spray fluid to said nozzles, said wheeled vehicle comprising a conventional motor truck having a cab and an engine, said control valve means being located within said cab, and pump means driven by said engine for supplying hydraulic and spray fluid pressure.

6. Mobile spray apparatus for use on a self-propelled land vehicle having an operator's position comprising, in combination, a frame fixedly attachable to vehicle, said frame having a support member extending upward near one side of said vehicle, a multi-section boom having an inner member with its inner end hingedly attached to an upper portion of said support member, a first remotely controllable actuating mechanism connected to said support member and said inner boom for actuating said inner boom member with respect to said support member, said multi-section boom having a second boom member hingedly attached to the outer end of said inner member, a second remotely controllable actuating mechanism connected to said inner boom member and said second boom member for actuating said second boom member with respect to said inner boom member, a plurality of nozzles disposed along said second boom member, first control means operatively connected to control the first said remotely controllable actuating mechanism, second control means operatively connected to control said second actuating mechanism, said first and second control means being located in proximity to said operator's position, means for supplying spray fluid to said nozzles including a pump and means for driving said pump; means for controlling the supply of spray fluid to said nozzles located in proximity to said operator's position.

7. Apparatus as claimed in claim 6 wherein said inner member is attached to said support member at a height not substantially less than four feet above ground level.

8. Apparatus as claimed in claim 6 wherein said inner member is hingedly connected to said support member for rotation about an axis lying in a horizontal plane and said second boom member is hingedly connected to said inner boom member for rotation about an axis substantially parallel to the last said axis.

9. Apparatus as claimed in claim 6, wherein the direction of spray of said nozzles with respect to said second boom member is adjustable and further including remotely controlled means for adjusting said direction.

10. Apparatus as claimed in claim 6 wherein said frame includes an arm extending to the lateral center of said vehicle and means pivotally securing the end of said arm at the lateral center of said vehicle, whereby said boom may be rotated to a position on either side of said vehicle for spraying either to the right or to the left of the path of said vehicle.

11. Apparatus as claimed in claim 6 wherein said support member is affixed forward of the operator's position whereby an operator may simultaneously observe the action of said spray apparatus and the roadway in front of said vehicle.

12. Apparatus according to claim 5 in which said inner and second boom members are respectively hinged to said vertical frame member and to each other for rotation about parallel axes normally parallel to the longitudinal axis of said vehicle.

13. Apparatus according to claim 5 having a third hydraulic cylinder coupled to said nozzles and operable to rotate said nozzles in a vertical plane and about an axis perpendicular to the axis of the boom member upon which said nozzles are disposed.

References Cited in the file of this patent

UNITED STATES PATENTS

| 616,334 | Hawland | Dec. 20, 1898 |
| 2,365,755 | Griffith | Dec. 26, 1944 |
| 2,565,587 | Bayett | Aug. 28, 1951 |
| 2,571,850 | Etnyre | Oct. 16, 1951 |
| 2,590,400 | Gallnick | Mar. 25, 1952 |
| 2,657,093 | Kucera | Oct. 27, 1953 |
| 2,695,812 | Harz | Nov. 30, 1954 |
| 2,725,256 | Devost et al. | Nov. 29, 1955 |
| 2,810,606 | Taylor | Oct. 22, 1957 |

FOREIGN PATENTS

| 2,587 | Great Britain | July 5, 1877 |
| 587,484 | Great Britain | Apr. 28, 1947 |